United States Patent [19]

Britton

[11] 4,270,598

[45] Jun. 2, 1981

[54] APPARATUS FOR PROCESSING SEAFOOD

[75] Inventor: Robert E. Britton, Edmonds, Wash.

[73] Assignee: Cloudy and Britton, Inc., Edmonds, Wash.

[21] Appl. No.: 875,416

[22] Filed: Feb. 6, 1978

[51] Int. Cl.³ .............................................. F25B 29/00
[52] U.S. Cl. ........................................ 165/61; 99/330;
99/355; 62/240
[58] Field of Search .................... 165/61; 99/330, 355;
426/506, 523, 524, 332, 520, 643; 62/65, 240,
376, 64

[56] References Cited

U.S. PATENT DOCUMENTS

| | | | |
|---|---|---|---|
| 1,887,463 | 11/1932 | Ogura | 62/240 |
| 2,501,655 | 3/1950 | Altenburg | 426/506 |
| 2,746,272 | 5/1956 | Carpenter | 62/64 |
| 2,909,040 | 10/1959 | Newell | 426/524 |
| 3,162,020 | 12/1964 | Beckmann | 62/64 |
| 3,332,338 | 7/1967 | Wein | 99/330 |
| 3,468,674 | 9/1969 | Levin | 426/532 |
| 3,592,668 | 7/1971 | Denk | 99/330 |
| 3,729,948 | 5/1973 | Schwartz | 426/524 |
| 3,788,302 | 1/1974 | Malaney et al. | 99/330 |
| 3,818,818 | 6/1974 | Hice, Sr. | 99/330 |
| 3,888,303 | 6/1975 | Skala | 165/61 |
| 4,051,690 | 10/1977 | Doust | 62/64 |
| 4,071,075 | 1/1978 | Hinkle | 165/61 |

FOREIGN PATENT DOCUMENTS

| | | | |
|---|---|---|---|
| 341154 | 1/1931 | United Kingdom | 426/524 |
| 348208 | 5/1931 | United Kingdom | 426/524 |

Primary Examiner—Albert W. Davis
Assistant Examiner—Margaret A. Focarino
Attorney, Agent, or Firm—Christensen, O'Connor, Johnson & Kindness

[57] ABSTRACT

An apparatus for processing seafood, suitable for use in small ships, is disclosed. The apparatus includes a closed container having an opening and a fluid tight closure to cover the opening. Cooking water and cold brine are stored in separate reservoirs and are maintained at predetermined cooking and freezing temperatures. Seafood is placed into the closed container for processing. Cooking water is continuously circulating through the closed container from the cooking water reservoir to cook the seafood during a cooking cycle. Thereafter, cold brine is continuously circulated through the fluid tight container from the cold brine reservoir to freeze the seafood during a freezing cycle. A rinse cycle can also be employed wherein rinsing water is circulated through the container between the cooking and freezing cycles. Additionally, if just freezing of seafood is desired, the cooking steps of the method and the cooking apparatus may be eliminated.

11 Claims, 4 Drawing Figures

APPARATUS FOR PROCESSING SEAFOOD

BACKGROUND OF THE INVENTION

This invention relates to an apparatus for processing seafood, more particularly, an apparatus suitable for cooking, rinsing and freezing seafood onboard ships.

The processing of crabs is typically achieved by using two steps: crabs are retrieved from crab pots and stored onboard small crabbing ships, and later transferred to a processing unit located either on land or on a large processing ship where the crabs are prepared for the market. The processing apparatus includes heavy and cumbersome conveyors and large open-topped tanks partially filled with processing fluids, all of which require considerable space onboard the ship. Moreover, it is most convenient and desirable to have the tanks and conveyors open to the atmosphere. Therefore, if the processing is done on ships, the processing equipment is ordinarily installed on an atmosphere-exposed upper deck of the ship. However, when the equipment is located on an upper deck, the processing must be accomplished in calm water for both ship stability and crew safety reasons. For example, in adverse sea conditions there is a substantial danger that hot cooking water will spill out the open-topped containers and burn crewmen as the processing ship rolls and pitches under the influence of the sea. Additionally, the location and weight of the processing apparatus and fluids on an upper deck, and the free-water effect associated with unenclosed, unfilled fluid containers can detrimentally affect the stability characteristics of the processing ship.

The current processing system requires that seaworthy, crab catching ships be used to retrieve the crab pots and store the crabs. Because the crabs will spoil very quickly after they die, the crabs must be kept alive onboard the crab catching ships. Care must be taken onboard the crab catching ships to ensure that enough seawater is circulated through the storage compartments, and that the crabs are not packed too tightly within the storage compartments to prevent the crabs on the bottom from being crushed. However, typically, the crab catchers desire to maximize the amount of crabs caught. Thus, the crabs may be kept just barely alive for a number of days before being transferred to a processing unit. Unfortunately, under these storage conditions, the quality of all of the crabmeat will be detrimentally affected.

When the crabs are transferred to the processing unit, they are killed and separated into two pieces at a butcher station, and then cleaned at the giller station. The crab pieces are then washed and placed on a conveyor which moves the crab pieces into a large, open-topped cooking container. The water in the cooking container is usually maintained at a constant temperature by piping steam into, and sometimes through, the container. After cooking, the crab pieces are transferred to a second conveyor which moves the crab pieces through a cooling and rinsing open-topped tank. The crab pieces are then loaded by hand into meshed freezing baskets moved by overhead conveyors and dropped into an open cold brine tank. When frozen, the crab pieces are removed from the brine tank and placed into closed containers to be stored in a cold storage or transported to destination by a refrigerated carrier.

It will be appreciated from the foregoing description, that the quality and quantity of crabmeat may be detrimentally affected because: the crabs may not be processed for up to two weeks after they are retrieved from the crab pots; the crabs are exposed to the atmosphere between the cooking, rinsing and freezing steps; some crabmeat will be lost (wasted) because of crabs dying prematurely; and the repeated handling and conveying of the crabmeat during the processing steps will partially disintegrate the crabmeat and result in wastage of the smaller crab pieces. Moreover, the relatively slow temperature changes that occur in the crabmeat during the conventional cooking and freezing steps may result in overcooking or undercooking of the meat, as well as a general deterioration of quality because of a high bacteria count.

Obviously, this prior art processing unit cannot be installed on the crab catching ships. The crab catching ships need most of the atmosphere-exposed, upper decks to store its many crab pots. Moreover, the stability of these smaller ships is already detrimentally affected by the storage of crab pots on the upper weather decks and cannot be further adversely affected by adding the prior art processing apparatus.

Therefore, it is an object of this invention to provide a new and improved apparatus for processing crab onboard ships.

It is a further object of this invention to provide a smaller, lightweight apparatus for processing crab that is adaptable for use on relatively small crab catching ships.

It is yet another object of this invention to provide a new and improved apparatus for processing crab wherein the crabs are processed when they come out of the sea and are not exposed to the atmosphere during the cooking, rinsing and freezing cycles.

It is yet another object of this invention to provide a new and improved apparatus for processing crab that will not detrimentally affect the stability of the ships on which they are used.

It is a further object of the present invention to provide a processing apparatus that will significantly shorten the processing time to provide a higher quality end product and to allow a greater throughput of crabmeat with a given amount of processing apparatus.

It is a further object of this invention to provide crab processing apparatus that occupies a minimum of space on the upper decks.

SUMMARY OF THE INVENTION

In accordance with this invention, an apparatus for processing seafood, especially crab, suitable for use on small ships is provided. The apparatus includes a closed container having an opening and a fluid tight closure for covering the opening. Seafood to be processed is placed into the closed container. Cooking water, maintained at a predetermined temperature, is then continuously circulated through the closed container from a hot water reservoir during a cooking cycle. Thereafter, cold brine, maintained at a predetermined temperature, is continuously circulated through the closed container from a cold brine reservoir during a freezing cycle. Preferably, the cooking water and the cold brine are continuously returned from the closed container to their respective reservoirs during the cooking and freezing cycles.

In accordance with further aspects of this invention the cooking water and the cold brine flow through the closed container from the bottom upward, at flow rates sufficient to maintain a temperature change of the cooking water and cold brine across the closed container of 2° F. or less.

In accordance with further aspects of this invention, the steps of the method and apparatus associated with cooking the seafood may be eliminated if freezing of seafood is all that is desired. Therefore, seafood is placed into the closed container. Cold brine, maintained at a predetermined temperature, is thereafter continuously circulated through the closed container from a cold brine reservoir during a freezing cycle.

In accordance with further aspects of this invention, the container is pressurized during the cooking and freezing cycles.

It will be appreciated from the foregoing summary that the apparatus of this invention may be readily used on crab catching ships. Since the apparatus is fully enclosed, it may be used in a variety of sea conditions without danger to personnel onboard the ships. Furthermore, the apparatus may be located anywhere onboard the ships (as space allows) because ventilation of the apparatus is not required. Stability of the crab catching ships is not detrimentally affected by the apparatus and may, in fact, be enhanced because the hot water and cold brine reservoirs may be located below the center of gravity of the ships. Seafood, especially crabmeat, can be processed in accordance with the invention not only with a minimal exposure to the atmosphere, but also immediately after the seafood is taken from the sea. Therefore, the quality of the processed seafood is greatly enhanced. Moreover, the apparatus of this invention permits a larger amount of crab to be caught and stored by the crab catching ships. The crabs are stored in a frozen, tightly packed condition, rather than kept alive, as required by the prior art methods.

BRIEF DESCRIPTION OF THE DRAWINGS

The foregoing objects and many of the attendant advantages of this invention will become more readily apparent as the same becomes better understood by reference to the following detailed description when taken in conjunction with the accompanying drawings wherein.

DESCRIPTION OF THE PREFERRED EMBODIMENT

Any connoisseur of seafood knows that seafood retains its most desirable taste and texture when it is prepared and devoured immediately after it is taken from the sea. The apparatus of this invention allows small crabbing ships to immediately process and freeze the crabs when they are removed from the sea in a manner that maximizes the quality of the crabmeat and minimizes waste, thereby retaining as nearly as possible the quality and flavor of fresh crabmeat.

Figure 1:
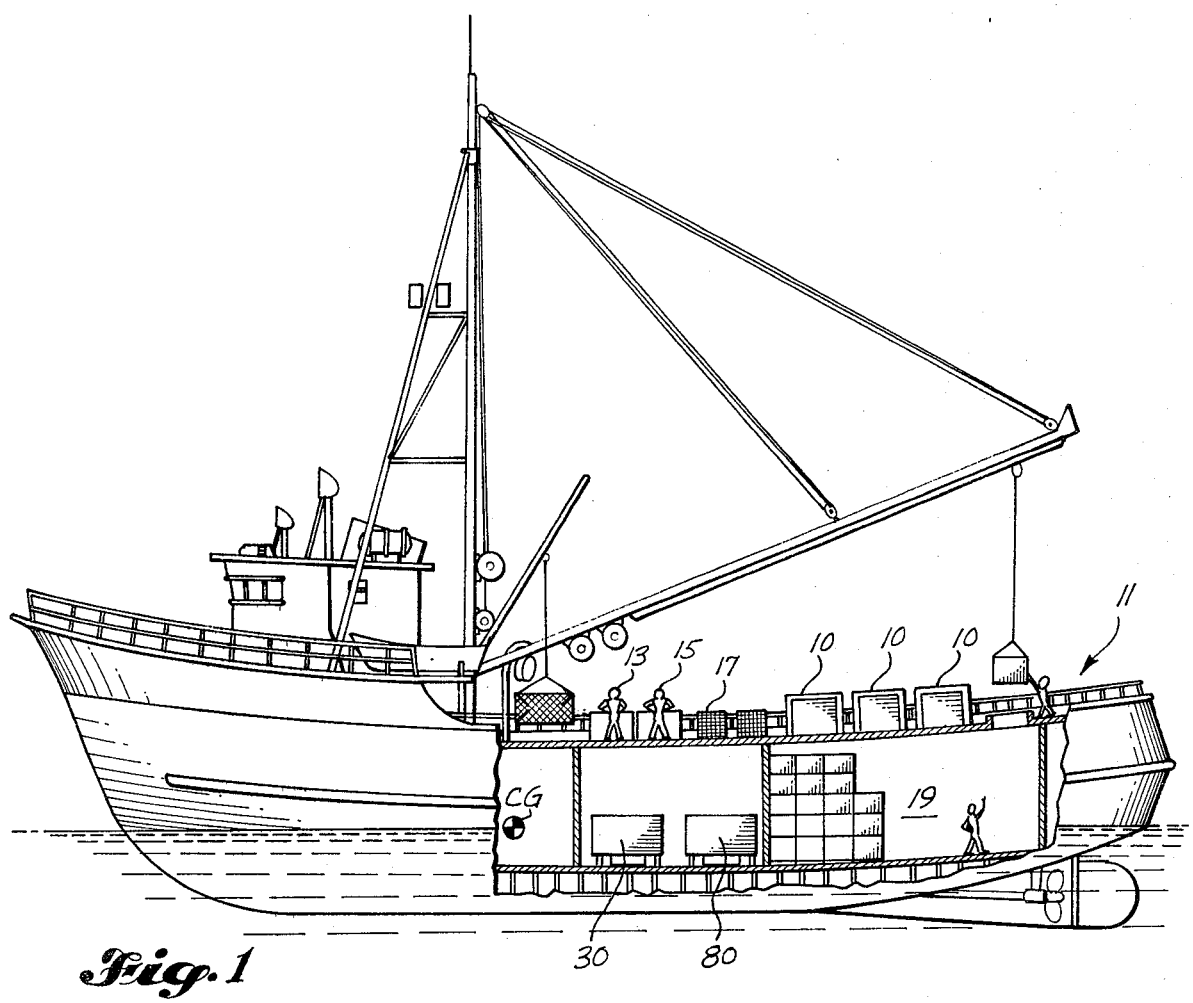
FIG. 1 is a side elevation view partially broken away of a crab catching ship illustrating the location of the crab processing apparatus constructed in accordance with this invention.
Figure 2:
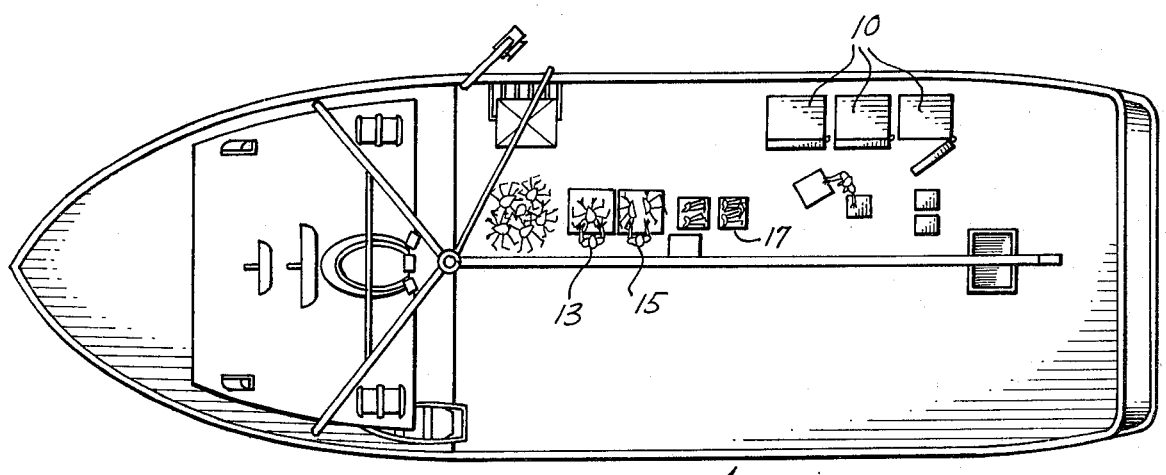
FIG. 2 is a top plan view of a crab catching ship illustrating the position of the closed containers forming part of the processing apparatus of the invention.

The preferred embodiment of this invention, as shown installed onboard a crab catching ship in FIGS. 1 and 2, permits processing of crabs immediately after they are removed from the sea. Crabs are taken onboard a small crab catching ship 11 and may be immediately killed and split by a butcher 13. Thereafter, the crabs are manually cleaned by a giller 15 and placed into meshed freezing baskets 17. The size of the basket is dependent upon the requirements and needs of crab wholesalers or reprocessers. The baskets 17, which are full of crab, are then stacked into a hollow, substantially fluid tight container 10. (As used hereinafter, the word "crab" is used in a collective manner to describe the plurality of crab pieces being processed.) Cooking, rinsing and freezing fluids are then continuously circulated through a closed container 10 during controlled cooking, rinsing and freezing cycles. The crab is then removed from the container 10 and stored in a cold storage compartment 19.

As illustrated in FIGS. 1 and 2, the closed containers 10 occupy very little ondeck space and are fully enclosed to allow crab processing in varied sea conditions without endangering the crewmen onboard the ship or adversely affecting the ship's stability characteristics. The stability of the ship may even be enhanced by locating the hot water reservoir 30 and the cold brine reservoir 80 below the center of gravity CG of the ship 11, as shown in FIG. 1. The processing system is fully enclosed and insulated so that thermal efficiency is maximized, and so that personnel onboard the ship will not be exposed to hot cooking water and freezing cold brine. Piping, valves and pumps (described in detail below, but not shown in FIGS. 1 and 2) permit cooking water and cold brine to be taken from the hot water reservoir 30 and the cold brine reservoir 80, continuously circulated through the closed container 10, and returned to their respective reservoirs 30 and 80, during separate cooking and freezing cycles. Preferably, the flow rates of the cooking water and cold brine through the closed container 10 during the cooking and freezing cycles are sufficient to maintain a 2° F. or less temperature drop and rise, respectively, across the container. Additionally, the containers are preferably pressurized during the cooking and freezing cycles. Upon completion of the cooking and freezing cycles, the cooking water and cold brine are drained to their respective reservoirs 30 and 80. Heat exchangers 56 and 120 are provided to maintain the temperatures of the cooking water and cold brine at predetermined levels within their respective reservoirs 30 and 80. Piping and valves are also provided to allow fresh seawater (rinsing water) to be continuously circulated through the closed container 10 from the ship's seawater circulating pump and discharged overboard during separate washing and rinsing cycles. An automatic control system activates and closes the appropriate valves in a timed sequence in the following order: seawater is continuously circulated through the closed container 10 to wash the crab; cooking water is then continuously circulated through the closed container from the hot water reservoir 30 to cook the crab; cooking water is drained from the container 10 to the hot water reservoir; fresh seawater is continuously circulated through the container 10 to cool and rinse the crab; cold brine is then continuously circulated through the container 10 from the cold brine reservoir 80, and cold brine is drained from the container 10 to the cold brine reservoir 80. The temperature changes of the crabmeat during the cooking, rinsing and freezing cycles are more rapid than the prior art processing systems. The bacteria count and salt content in the crabmeat is extremely small. Therefore, the crabmeat processed by the method and apparatus of this invention is of superior quality.

Figure 3:
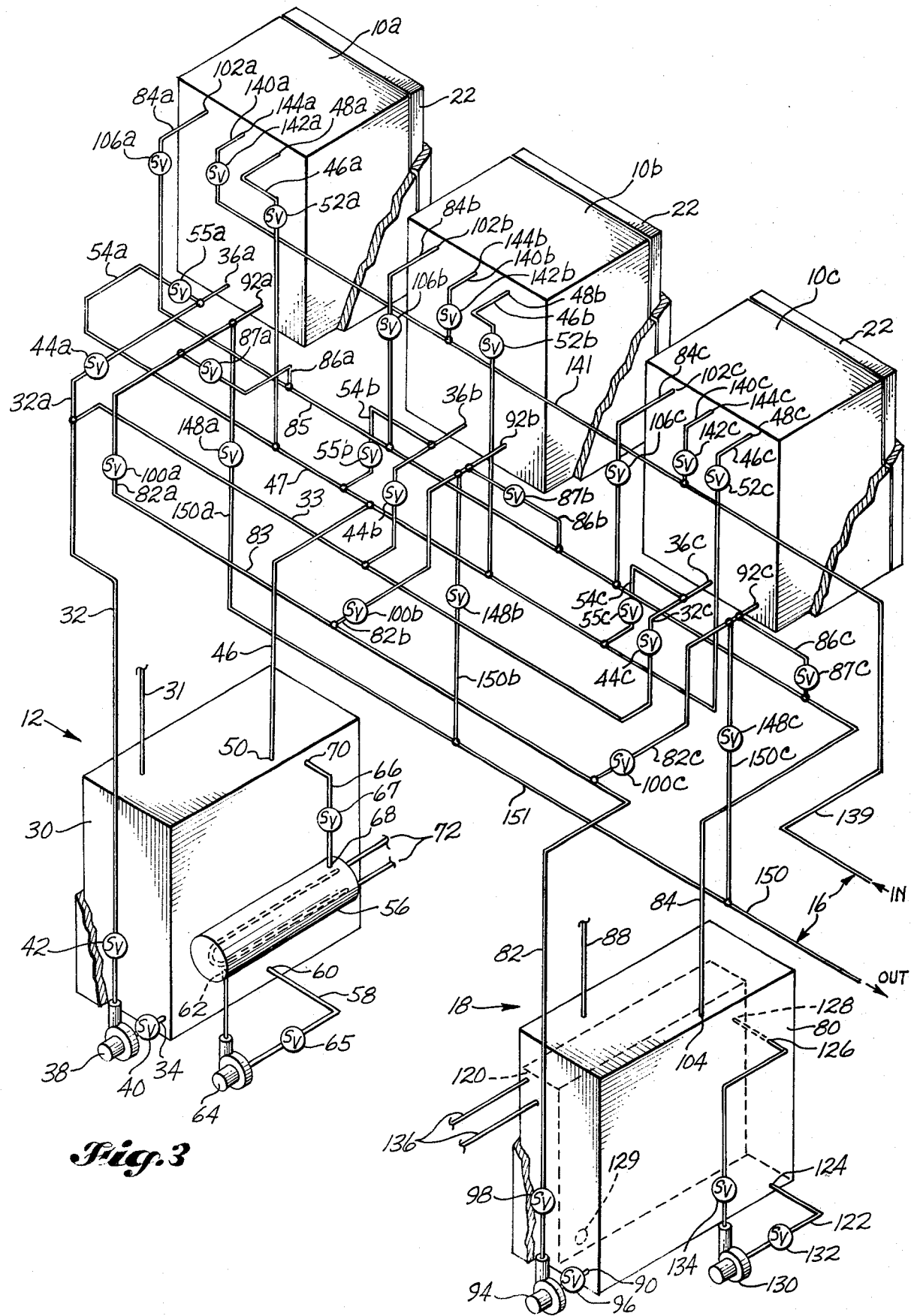
FIG. 3 is a diagrammatic, isometric view of the crab processing apparatus of this invention.

Referring to FIG. 3, the preferred embodiment of this invention includes closed, substantially fluid tight containers 10a, b and c and apparatus 12, 16 and 18 associated with the containers 10a, b and c for cooking, rinsing and freezing the crab within the closed containers. Each container may vary in size and shape. For convenience and accessibility, the closed containers 10a, b and c are preferably mounted on the main deck of the ship 11. But, because the containers 10a, b and c are fully enclosed and substantially fluid tight, they could be located anywhere onboard the ship 11 (as space allows). One side of each closed container is open. A fluid tight door 22 covers the open side and is hinged to each container to open sideways about a vertical hinge axis. Additionally, the exposed surfaces of the closed containers 10a, b and c and the doors 22 are completely insulated to limit heat transfer through the containers and door walls, thereby enhancing thermal efficiency of the containers and protecting crewmen from being burned if they inadvertently contact the containers 10a, b and c.

As shown in the figures, three closed containers 10a, 10b and 10c are provided to increase the crab processing capacity over that which could be achieved by using only a single container. For example, in container 10a crab could be loaded and unloaded; crab could be freezing in container 10b and crab could be cooking in container 10c. However, any number of closed containers could be used in any sequence of processing steps, depending upon the size of the ship and the particular processing requirements.

The cooking apparatus 12 associated with the container for cooking the crab includes a hot water reservoir 30, a steam-to-water heat exchanger 56, piping between the hot water reservoir 30 and the closed container 10 and steam-to-water heat exchanger 56, and associated valves, pumps and piping. Preferably, all of the exposed surfaces of the cooking apparatus are insulated to enhance thermal efficiency and to protect the personnel onboard the ship.

To effectuate a gravity drain of cooking water from the closed container 10 to the hot water reservoir 30, the reservoir 30 is preferably located below the closed container 10. The hot water reservoir 30 preferably has a capacity approximately three times greater than the capacity of a single closed container 10 so that, if desired, crab can be simultaneously cooked in all three containers. When hot water is not flowing to any of the containers, the hot water reservoir 30 and the steam-to-water heat exchanger 56 are completely filled so that the cooking water overflows into an overflow conduit 31, which orthogonally projects from the upper surface of the hot water reservoir 30 to thereby avoid ship stability problems associated with the free water effect of a partially filled reservoir 30.

A cooking water supply pipe 32 connects the bottom of the hot water reservoir 30 at discharge opening 34, with the bottom of closed containers 10a, b and c at cooking supply openings 36a, 36b and 36c. A pump 38 is incorporated into the supply pipe 32 to selectively supply containers 10a, b and c with cooking water and is located at substantially the same vertical level as the discharge opening 34 in the hot water reservoir 30. Pump input valve 40 and discharge valve 42 are located in the supply pipe 32 adjacent the pump 38 to selectively permit flow of cooking water through the pump 38. To minimize the exposure of crewmen on the main deck to the supply pipe 32, the supply pipe 32 has a horizontally oriented manifold section 33 lying just below the main deck. The supply pipe 32 has individual container feed sections 32a, 32b and 32c which individually feed cooking water into each closed container 10a, b and c from the horizontally oriented manifold section 33. Cooking water supply valves 44a, 44b and 44c are incorporated into the individual container feed sections 32a, b and c of supply pipe 32 to selectively permit flow of cooking water to the containers 10a, b and c. The use of a single pipe from the reservoir 30 to service a plurality of closed containers 10a, b and c is known as a "common rail" piping system.

A cooking water return pipe 46 connects the top of each closed container 10a, b and c at cooking discharge openings 48a, 48b and 48c, to the top of hot water reservoir 30 through return opening 50. Thus, circulation of cooking water through the closed containers 10a, b and c is upward from the bottom of the container. The return pipe 46 is also a common rail system. In other words, individual container output sections 46a, 46b and 46c of a return pipe 46 connect the discharge openings 48a, b and c of each container 10a, b and c with a horizontally oriented manifold section 47 located just below the main deck of the ship. Cooking water discharge valves 52a, 52b and 52c are located in individual container output sections 46a, b and c of the return pipe 46 to selectively permit flow of cooking water from the containers 10a, b and c to the reservoir 30.

To gravity drain cooking water from the closed containers 10a, b and c upon completion of the cooking cycle, crossover pipes 54a, 54b and 54c connect the supply pipe individual container feed sections 32a, b and c with the horizontally oriented manifold section 47 of the return pipe 46. Crossover valves 55a, 55b and 55c are incorporated into the crossover pipes 54a, b and c to selectively permit the flow of cooking water through the crossover pipes.

A steam-to-water heat exchanger 56, located adjacent to the hot water reservoir 30, maintains the cooking water within the hot water reservoir 30 at approximately 212° F. A heat exchange supply pipe 58 connects the bottom of the hot water reservoir 30 at opening 60 to the bottom of heat exchanger 56 at opening 62. A circulating pump 64 is incorporated into the heat exchange supply pipe 58, and is located at approximately the same vertical level as the opening 60 in the reservoir 30. A heat exchange return pipe 66 receives cooking water overflowing out of opening 68 at the top of the heat exchanger 56, and directs the water back into the reservoir 30 through opening 70 adjacent the top of the reservoir 30. Valves 65 and 67 are appropriately located in the heat exchange supply and return pipes 58 and 66 to permit flow of cooking water to and from the steam-to-water heat exchanger 56. Steam is generated by a standard steam generator or boiler located external to the heat exchanger 56 and is continuously piped through heat exchange coils located within the heat exchanger 56 via steam supply and return pipes 72.

The freezing apparatus 18 associated with the closed container for freezing the crab, including a cold brine reservoir 80, common rail cold brine supply 82 and return 84 circulation systems and the crossover piping 86a, 86b and 86c, is identical in size and relative position with respect to the containers 10a, b and c, with the respective apparatus 12 associated with cooking the crab. Therefore, the cold brine reservoir 80 has a capacity that is approximately three times greater than a single closed container 10, and is preferably located below the closed container 10. The exposed surfaces of the cold brine reservoir 80 are insulated to increase thermal efficiency of the system and to protect personnel who might contact the cold surfaces. Stability of the ship is enhanced by eliminating the free water effect within the reservoir 80 during storage periods by initially filling the reservoir 80 with cold brine until the brine overflows into overflow conduits 88 which orthogonally project upward from the upper surface of the reservoir 80.

The common rail cold brine supply pipe 82 permits the bottom of the reservoir 80, at opening 90, to be in fluid communication with the closed containers 10a, b and c, at openings 92a, 92b and 92c. Incorporated into the cold brine supply pipe 82 are a brine supply pump 94, pump input and discharge valves 96 and 98, brine supply valves 100a, 100b, and 100c, supply pipe individual container feed sections 82a, 82b and 82c and a horizontally oriented manifold section 83 to selectively permit flow of cold brine from the reservoir 80 to the containers 10a, b and c. The common rail cold brine return pipe 84 places the top of the closed containers 10a, b and c at brine discharge openings 102a, 102b and 102c in fluid communication with the top of the cold brine reservoir 80 through an opening 104. Incorporated into the cold brine return pipe 84 are brine discharge valves 106a, 106b and 106c; return pipe individual container output sections 84a, 84b and 84c and a horizontally oriented manifold section 85 to permit flow of cold brine from the containers 10a, b and c to the reservoir 80. The orientation, location and requirements of the apparatus associated with the cold brine supply and return pipes 82 and 84 are substantially identical to the orientation, location and requirements of the previously described apparatus associated with the cooking water supply and return pipes 32 and 46. Therefore, during a freezing cycle, cold brine is continuously circulated from the cold brine reservoir 30 through the closed containers 10a, b and c from the bottom of the container to the top, and is returned to the reservoir 30.

To drain cold brine from the closed containers 10a, b and c to the cold brine reservoir 80 upon completion of the freezing cycle, crossover pipes 86a, 86b and 86c, with corresponding crossover valves 87a, 87b and 87c incorporated therein, are provided to connect the supply pipe individual container feed sections 82a, b and c with the horizontally oriented manifold section 85 of the return pipe 84.

A refrigerant-to-brine heat exchanger 120 is preferably located internally within the cold brine reservoir 80. A brine refrigeration supply pipe 122 receives brine from opening 124 adjacent the bottom of the cold brine reservoir 80, passes through the reservoir 80 through opening 126 adjacent the upper surface of the reservoir 80, and discharges the brine into the refrigerant-to-brine heat exchanger 120 at opening 128 adjacent the upper surface of the refrigerant-to-brine heat exchanger 120. A circulating pump 130, and pump input and discharge valves 132 and 134, respectively, are incorporated into the brine refrigeration supply pipe 122 adjacent opening 124. Refrigeration discharge opening 129 is located near the bottom of the refrigerant-to-brine heat exchanger 120, and in close proximity to supply opening 90. Thus, cold brine is discharged from the refrigerant-to-brine heat exchanger 120 during a freezing cycle to be immediately circulated to the closed container 10 via the brine supply pipe 82. A standard refrigeration system is used in conjunction with the refrigerant-to-brine heat exchanger 120. Thus, a refrigerant such as R12, R22, R502 or R717 is circulated through cooling coils located within the refrigerant-to-brine heat exchanger 120 via supply and return pipes 136.

A supply pipe 139 connects each of the closed containers 10a, b and c at seawater supply openings 144a, 144b and 144c adjacent the top of each container, to the ship's seawater recirculation pumps. A distributor is attached at the seawater supply openings 144a, b and c, to distribute the seawater evenly so that all of the crab in the containers 10a, b and c will be contacted by the seawater at the appropriate time. The seawater supply pipe 139 consists of a horizontal section 141 which spans the three closed containers 10a, b and c, and individual container sections 140a, b and c, which connect the horizontal section 141 with the closed containers 10a, b and c. Seawater supply valves 142a, 142b and 142c are incorporated into the individual container sections 140a, 140b, and 140c to selectively permit flow of seawater to the containers 10a, b and c. A seawater discharge pipe 150 is connected to the cold brine supply pipe 82 between brine supply valves 100a, b and c and openings 92a, b and c. The seawater discharge pipe 150 consists of a horizontal section 151 horizontally spanning the three closed containers 10a, b and c, and individual container sections 150a, b and c connecting the brine supply pipe 82 of each closed container 10a, b and c to the horizontal section 151. Seawater discharge valves 148a, 148b and 148c are located in the individual container sections 150a, b and c to selectively permit flow of seawater from the containers 10a, b and c back to the sea. Therefore, during the washing and rinsing cycles, fresh seawater continuously circulates through the closed containers 10a, b and c from the top of the containers. Fresh water may also be used as a rinsing water during the washing and rinsing cycles. Fresh water could be circulated by a recirculating pump from a fresh water source, through the seawater circulation system previously described. The seawater gravity drains out the bottom of the containers and is eventually discharged overboard.

All of the valves incorporated into piping going to and coming from the closed containers 10a, b and c, described above, are solenoid actuated collapsing sleeve valves obtainable from Galigher Valve Co., 545–548 W. 8th S., Salt Lake City, Utah 84110. If the crab processing apparatus should fail to operate properly, the collapsing sleeve valves would automatically open and fluids in the containers 10a, b and c would be immediately drained from the containers 10a, b and c.

The operation of all of the collapsing sleeve valves is automatically controlled by a control system (not shown). The control system includes a timer which automatically causes the appropriate valves to open and close during the washing, cooking, rinsing and freezing cycles, as explained below. The time periods for the washing, cooking, rinsing and freezing cycles are preferably individually adjustable so that individual cycles may be modified without altering the whole timing sequence. The design of the control system is well within the skill of a person of ordinary skill in the art, after reading the description of the equipment (explained above) and the processing sequence (explained below).

The internal temperature of the individual closed containers 10a, b and c is recorded in a temperature versus time graph by suitable recorders, for each batch of crab processed within each container. Therefore, a written processing record is maintained for every crab processed to show that the crabmeat was properly processed. Temperature sensing elements mounted within the closed containers 10a, b and c constantly measure the average internal temperature of the closed containers 10a, b and c, and are connected with the recorders.

Figure 4:
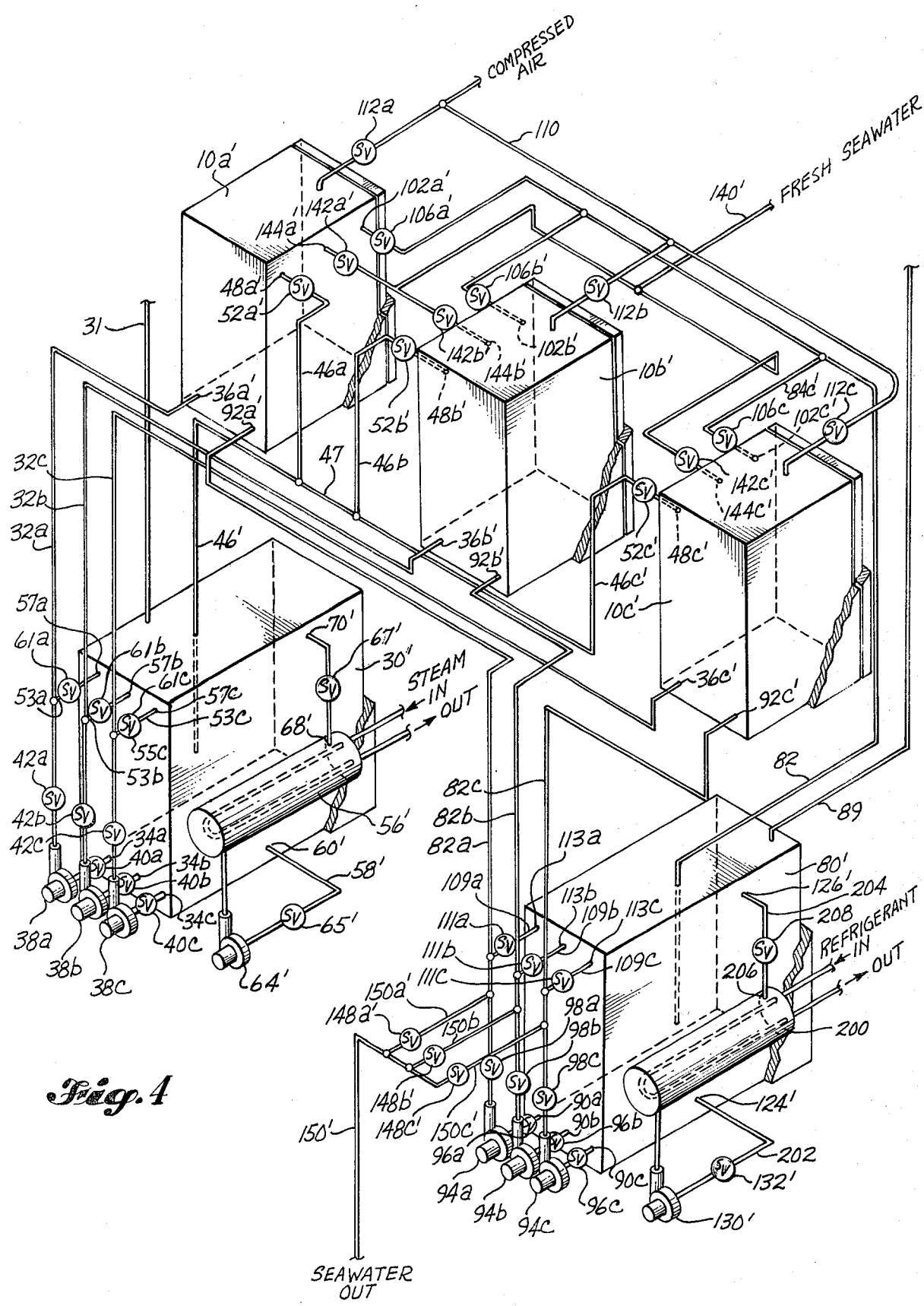
FIG. 4 is a diagrammatic, isometric view of an alternate crab processing apparatus of this invention.

FIG. 4 illustrates an alternative or modified embodiment of the crab processing apparatus formed in accordance with this invention. This modified embodiment employs individual cooking water and cold brine supply piping to each of the closed containers 10a, b and c, and eliminates the common rail supply pipes 32 and 82 and cooking and brine supply valves 44a, b, and c and 100a, b and c, respectively.

In this modified embodiment, three cooking water supply pipes 32a, b and c individually feed cooking water into the bottom of the closed containers 10a', b' and c', respectively. Each cooking water supply pipe 32a, b and c connects the bottom of the hot water reservoir 30' at discharge openings 34a, b and c, with the bottom of the closed containers 10a', b' and c' at cooking supply openings 36a', b' and c'. Pumps 38a, b and c are incorporated into their respective supply pipes 32a, b and c, and are located as previously described. Pump input 40a, b and c and discharge valves 42a, b and c are located in their respective supply pipes 32a, b and c adjacent to their pumps 38a, b and c. Likewise, cold brine supply pipes 82a, b and c individually feed cold brine to the bottom of the closed containers 10a', b' and c' at openings 92a', b' and c' from the bottom of the cold brine reservoir 80' at openings 90a, b and c. Incorporated into the cold brine supply pipes 82a, b and c are brine supply pumps 94a, b and c, and pump input and discharge valves 96a, b and c and 98a, b and c, respectively. Additionally, the crossover pipes 54a, b and c, and 86a, b and c (and crossover valves 55a, b and c and 87a, b and c) are eliminated in this alternate embodiment. Instead, cooking water drain pipes 53a, b and c connect their respective supply pipes 32a, b and c to the top of the hot water reservoir 30' at openings 57a, b and c. Drain valves 61a, b and c are incorporated in the drain pipes 53a, b and c. Similarly, cold brine drain pipes 109a, b and c (with drain valves 111a, b and c) connect cold brine supply pipes 82a, b and c with the top of cold brine reservoir 80' at openings 113a, b and c.

If the hot water reservoir 30' and/or the cold brine reservoir 80' are located above the closed containers 10a', b' and c', compressed air may be injected into the containers 10a', b' and c' to blow down and drain the cooking water and cold brine back to their respective reservoirs upon completion of the cooking and freezing cycles. Compressed air could also be used in conjunction with gravity drainage when the reservoirs 30' and/or 80' are located below the containers 10a', b' and c' to speed up the removal of cooking water and cold brine from the closed containers 10a', b' and c'. Compressed air supply pipes 110 with appropriate control valves 112a, b and c are illustrated in FIG. 4.

An alternative refrigerant-to-brine heat exchanger 200 may be provided, as shown in FIG. 4. This alternative refrigerant-to-brine heat exchanger 200 is located external to the cold brine reservoir 80' and can be coupled to the reservoir 80' in a manner substantially identical to the steam-to-water heat exchange system previously described. A supply pipe 202 connects the bottom of the heat exchanger 200 at opening 124' with the bottom of the cold brine reservoir 80'. Circulating pump 130' and pump input valve 132' are incorporated into the supply pipe 202. Return pipe 204 receives cold brine overflowing out the top of the heat exchanger 200 at opening 206 and directs cold brine back to the reservoir 80' through opening 126'. A valve 208 is incorporated into the return pipe.

OPERATION

In the quiescent condition, all valves are deenergized and all pumps are shut off. With reference to the embodiment illustrated in FIG. 3, fresh water or seawater completely fills the hot water reservoir 30 and, the steam-to-water heat exchanger 56 and overflows into overflow conduit 31, as well as the supply and return pipes 32 and 46. Cold brine, having a freezing point of 14° F. or below and preferably a −6° F. eutectic point, completely fills the cold brine reservoir 80 and overflows into overflow conduit 88, supply pipe 82 and return pipe 84.

Before initiating the crab processing system, the cooking water and cold brine must be brought to correct temperature levels. The steam-to-water heat exchanger 56 is activated by opening valves 65 and 67 and actuating pump 64. Cooking water is circulated through the steam-to-water heat exchanger 56 at the rate of 600 g.p.m., in the case of the embodiment shown, and is preferably brought to and maintained between 210° F. and 212° F. in the reservoir 30. Cooking water temperatures may vary between 180° F. and 212° F. and produce satisfactory results. However, if lower cooking water temperatures are used, long cooking times will be necessary. Additionally, whatever temperature is chosen, it is desirable to maintain the temperature of the cooking water in the reservoir 30 within 4° F. so that the length of the cooking cycle may be consistent. The refrigerant-to-cold brine heat exchanger 120 is also actuated. Valves 132 and 134 are opened and pump 130 is activated. Cold brine is recirculated through the refrigerant-to-brine heat exchanger at the rate of 600 g.p.m., in the case of the embodiment shown, and is preferably brought to and maintained between −5° F. and 0° F. in the reservoir 80. The temperature of the cold brine may vary between 14° F. and −5° F. The length of the freezing cycle is increased if higher temperatures of cold brine are used. Whatever temperature is chosen, it is desirable to maintain the cold brine in the reservoir 80 within 4° F. so that the length of the freezing cycle may be consistent. The crab processing apparatus is now ready for operation.

The control system is activated and energizes all of the valves. Pump input and discharge valves 40, 42, 96 and 98 are opened (deenergized) and the cooking water circulation pump 38 and cold brine circulation pump 94 are actuated. Therefore, cooking water, seawater and cold brine are maintained in their respective supply pipes 32, 139 and 82 up to supply valves 44a, b and c; 142a, b and c; and 100a, b and c, respectively. Baskets 17 of crab are stacked in container 10a. When the fluid tight door 22 is shut, the timer in the control panel takes charge of the crab processing apparatus. Seawater supply and discharge valves 142a and 148a are opened. Fresh seawater is circulated through closed container 10a at approximately 450 g.p.m., in the case of the embodiment shown, to wash and clean the crab, and to remove any blood remaining on the exposed parts of the crab after gilling. This forced flow cleaning step assists in preventing the crabmeat from establishing a bluish color after it is processed. After the crab is washed for approximately 10 minutes, seawater supply valve 142a is closed, seawater is allowed to drain from the container 10a. Seawater discharge valve 148a is then closed.

Cooking water supply valve 44a and discharge valve 52a are opened and cooking water is circulated to closed container 10a at the rate of 450 g.p.m. A desirable flow rate of cooking water through closed container 10a is such that the maximum temperature drop of the cooking water across the container 10a is 2° F. or less. Flow rates between 150 g.p.m. and 450 g.p.m. have been found to be satisfactory to maintain the desired temperature drop. The flow of cooking water through the closed container 10a is from the bottom upward, so that crabmeat will not be dislodged from the crab pieces during the cooking cycle. Therefore, the container 10a will fill to the top before being discharged out opening 48a. The pressure drop caused by this method of circulation and the physical constructon of closed container 10 with baskets 17 baffled to minimize the bypassing of processing fluids around said baskets and to direct said processing fluids through the crab sections contained within baskets 17 creates a desired fluid pressurization of the cooking water within closed container 10a. Fluid pressurization can also be achieved by reducing the diameter of the outlet openings 48a, b and c and/or by modifying the physical construction of return pipe 46. Fluid pressurization within closed container 10a is preferably less than 5 p.s.i.g., but could vary between 0 and 15 p.s.i.g. The pressurized continuous circulation of the cooking water through closed container 10a causes a very rapid uniform temperature change of all of the crabmeat in the container 10a. Upon completion of the cooking cycle, approximately 20 minutes if the cooking water temperature is in the preferred range, cooking water supply and discharge valves 44a and 48a are closed and crossover 55a is opened. Cooking water gravity drains from the container 10a out opening 36a; and through the cooking water return pipe 46 via the crossover pipe 54a, back to the reservoir 30.

When drainage of cooking water from closed container 10a is complete, crossover valve 55a is closed and seawater supply and discharge valves 142a and 148a are opened to continuously circulate fresh seawater through the container 10a to cool and rinse the crab. The crab is cooled and rinsed for approximately 10 minutes. Seawater supply valve 142a is then closed, and, when container 10a is drained of seawater, seawater discharge valve 148a is closed.

The crab freezing cycle is initiated by opening cold brine supply and discharge valves 100a and 106a. The flow characteristics of the cold brine through closed container 10a are the same as the flow charcteristics of the cooking water through closed container 10a, as previously described. Therefore, cold brine is continuously circulated through closed container 10a from the bottom upward at the desired rate so that the maximum temperature rise of the cold brine across the container 10a is 2° F. or less, and the container 10a is fluid pressurized up to 15 p.s.i.g. After the 20 minute freezing cycle is completed (assuming cold brine temperature is in the preferred range) cold brine supply and discharge valves 100a and 106a are closed. Crossover valve 87a is opened, and cold brine is drained from closed container 10a to the cold water reservoir 80. When drainage is complete, crossover valve 87a is closed.

One skilled in the art would be led to believe that freezing crabmeat under fluid pressure in a cold brine solution would increase the salt content of the crabmeat to undesirable levels. However, it has been found that salt content in the crabmeat is actually lower when the crabmeat is frozen under pressure than when it is frozen without fluid pressurization.

Three closed containers 10a, b and c allow for continuous processing of crab. For example, crab may be stacked and washed in container 10c; crab could be cooking in container 10b; and crab could be freezing in container 10a. By using three closed containers in series, the crab processing apparatus can process crab at the same rates as prior art systems (for example, 1600 to 1800 pounds of crab per hour) with only half of the personnel required to operate the prior art crab processing system.

The operation of the alternative embodiment, shown in FIG. 4, is substantially similar to the operation of the preferred embodiment just described. The alternate crab processing apparatus is readied for operation as before. The heat exchangers 56' and 200 are activated, and liquids in the hot water and cold brine reservoirs 30' and 80' are brought to their appropriate temperatures. Baskets of crab are placed into container 10a' and the crab is washed as before. Pump input and discharge valves 40a and 42a, respectively, and cooking water discharge valve 52a' are opened, and pump 38a is activated. The flow rate and direction of flow of the cooking water through the container 10a' and pressurization of the container 10a' is the same as before. After the 20 minute cooking cycle is completed, discharge valve 52a' and pump input and discharge valves 40a and 42a are closed, and pump 38a is deactivated. Drain valve 61a is then opened and cooking water gravity drains from container 10a' back to the reservoir 30'.

When the rinsing and cooling step is completed as previously described, pump input and discharge valves 96a and 98a and cold brine discharge valve 106a' are opened, and pump 94a is activated. The flow rates and direction of flow of cold brine through the container 10a' is the same as in the preferred embodiment explained above. Upon completion of the freezing cycle, pump input and discharge valves 96a and 98a and cold brine discharge valve 106a' are closed; pump 94a is deactivated; drain valve 111a is opened. Cold brine gravity drains from the container 10a' to the reservoir 80'. When drainage is complete, drain valve 111a is closed.

The following is an example of the equipment that may be used in the crab processing system. Each container 10a, b and c has a rectangular longitudinal and transverse cross section and has a volume that is approximately 51 cubic feet. Therefore, each container can hold up to eight 75 pound normal capacity freezer baskets. The volume of the reservoirs 30 and 80 are approximately 150 cubic feet. The cooking water and cold brine supply pumps 38 and 94 are 450 g.p.m. centrifugal pumps having a 35 foot T.D.H. Standard four inch pipes and valves were used throughout the system with the exception of the heating and cooling coils 72 and 136. The openings in the reservoirs 30 and 80, containers 10a, b and c and heat exchangers 56 and 120 have diameters equalling the inside diameter of the four inch pipe. The pumps 64 and 130 for circulating cooking water and cold brine through their respective heat exchangers 56 and 120 are 600 g.p.m. centrifugal pumps having a 15 foot T.D.H.

It will be appreciated from the foregoing description of the crab processing apparatus and method, that this invention may be used by small crab ships under varied sea conditions. The stability characteristics of the small crab ships are not detrimentally affected by this invention because the apparatus is a completely internal system and the hot water and cold brine reservoirs are preferably located below the center of gravity of the crab ship. The closed containers require very little on-deck space, are thermally efficient, easy to clean, and present minimal safety hazards for personnel onboard the crab ship. Because the crab is processed immediately after it is taken from the water and processed in an enclosed, forced fluid flow and temperature-controlled environment, the quality of the crabmeat is the best that is possible.

While the herein-described invention was developed for use by seagoing ships that catch crabs, and is described in that environment, it will be appreciated that the invention has broader applicability. For example, the invention is suitable for use in other environments where it is desirable to cook and feeze seafood immediately after the seafood is trapped, or otherwise caught, and brought onboard a ship. Also, it will be appreciated by those skilled in the art and others that various changes can be made herein without departing from the spirit and scope of the invention. For example, if freezing seafood is all that is desired, the apparatus associated with cooking the seafood may be eliminated. Therefore, seafood may be placed into the closed containers, rinsed and frozen as previously described.

The embodiments of the invention in which an exclusive property or privilege is claimed are defined as follows:

1. In a fishing vessel, an apparatus for processing of seafoods comprising:
   a closed container having an opening and a fluid-tight closure to cover said opening;
   means associated with said container for pressurizing said container to a predetermined level above atmospheric pressure
   hot water reservoir means for storing cooking water;
   means associated with said hot water reservoir means for maintaining the temperature of said cooking water at a predetermined level;
   cold brine reservoir means for storing cold brine used to freeze said seafood;
   means associated with said cold brine reservoir means for maintaining the temperature of said brine at a predetermined level;
   means associated with said closed container and said hot water reservoir means for continuously circulating said cooking water from said hot water reservoir means through said container and back to said hot water reservoir means during a cooking cycle; and
   means associated with said closed container and said cold brine reservoir means for continuously circulating said cold brine from said cold brine reservoir means through said container and back to said cold brine reservoir means during a freezing cycle.

2. The apparatus defined in claim 1 wherein said closed container is located on an upper deck of said fishing vessel and wherein said hot water reservoir means and said cold brine reservoir means are located below said upper deck of said fishing vessel.

3. The apparatus of claim 1 including means associated with said container for continuously circulating rinsing water through said container during a rinsing cycle.

4. The apparatus of claim 2 wherein said means for pressurizing said container includes said means for continuously circulating cooking water through said container during said cooking cycle.

5. The apparatus of claim 2 wherein said means for pressurizing said container includes said means for continuously circulating cold brine through said container during said freezing cycle.

6. The apparatus of claim 4 wherein said means for pressurizing said container includes said means for continuously circulating cold brine through said container during said freezing cycle.

7. The apparatus of claim 6 including means associated with said closed container and said hot water reservoir means for draining said cooking water from said container to said hot water reservoir means upon completion of said cooking cycle.

8. The apparatus of claim 7 wherein said cooking water draining means includes compressed air means associated with said closed container for creating gas pressure within said container to urge said cooking water out of said container.

9. The apparatus of claim 8 including means associated with said closed container and said cold brine reservoir means for draining said cold brine from said container to said cold brine reservoir means upon completion of said freezing cycle.

10. The apparatus of claim 9 wherein said cold brine draining means includes compressed air means associated with said closed container for creating gas pressure within said container to urge said cold brine out of said container.

11. The apparatus of claim 10 wherein said hot water reservoir means and said cold brine reservoir means each includes overflow conduit means associated with the top of said reservoir means for receiving excess cooking water and cold brine, respectively, during a quiescent condition.

* * * * *